United States Patent
Mayr-Fröhlich et al.

(10) Patent No.: US 6,749,271 B1
(45) Date of Patent: Jun. 15, 2004

(54) BRAKE SYSTEM FOR VEHICLES, ESPECIALLY COMMERCIAL VEHICLES

(75) Inventors: Mathias Mayr-Fröhlich, Germering (DE); Paolo Pizzolato, Landsberg/Lech (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 14 days.

(21) Appl. No.: 10/049,836

(22) PCT Filed: Aug. 17, 2000

(86) PCT No.: PCT/EP00/08016
§ 371 (c)(1), (2), (4) Date: Jul. 22, 2002

(87) PCT Pub. No.: WO01/12486
PCT Pub. Date: Feb. 22, 2001

(30) Foreign Application Priority Data

Aug. 18, 1999 (DE) .......................... 199 39 035

(51) Int. Cl.⁷ .................................. B60T 8/44
(52) U.S. Cl. .......................... 303/114.3; 303/122.11; 188/1.11 E
(58) Field of Search .................. 303/118.1, 114.3, 303/122.02, 122.03, 122.1, 122.11, 122.15; 188/1.11 E, 1.11 R

(56) References Cited

U.S. PATENT DOCUMENTS

| | | | | |
|---|---|---|---|---|
| 3,726,568 A | * | 4/1973 | Krugler, Jr. ............. | 303/115.5 |
| 4,192,557 A | * | 3/1980 | Leiber ..................... | 303/114.3 |
| 4,316,529 A | * | 2/1982 | Yanagawa et al. ......... | 182/135 |
| 4,345,672 A | * | 8/1982 | Nakasu ................... | 188/1.11 R |
| 4,771,604 A | * | 9/1988 | Nakano ................... | 188/1.11 E |
| 4,773,222 A | * | 9/1988 | Tanaka et al. .......... | 188/1.11 E |
| 4,889,395 A | * | 12/1989 | Fujita et al. ............. | 303/115.1 |
| 4,973,108 A | * | 11/1990 | Maki et al. .............. | 303/118.1 |
| H1912 H | * | 11/2000 | Arndt ..................... | 303/3 |

FOREIGN PATENT DOCUMENTS

| | | | |
|---|---|---|---|
| DE | 25 16 077 | 10/1976 | |
| DE | 27 26 640 | 12/1978 | |
| DE | 2726640 A1 | * 12/1978 | ............ B60T/8/04 |
| DE | 28 51 264 | 6/1979 | |
| DE | 38 28 931 | 3/1990 | |
| DE | 39 21 309 | 1/1991 | |
| DE | 44 23 086 | 1/1996 | |

OTHER PUBLICATIONS

"Antilock Systems (ABS) for Commercial Vehicles", Section 7, WABCO Co., 1992.

\* cited by examiner

Primary Examiner—Robert Siconolfi
(74) Attorney, Agent, or Firm—Crowell & Moring LLP

(57) ABSTRACT

The invention relates to a pneumatic-hydraulic brake system with a pneumatic/hydraulic converter which converts a pressure that is pneumatically input by the driver into a hydraulic brake pressure. A sensor is provided which detects a physical variable that gets adjusted in the converter when the pneumatic pressure is input. The sensor generates a warning signal when a pre-given variable is detected.

20 Claims, 1 Drawing Sheet

BRAKE SYSTEM FOR VEHICLES, ESPECIALLY COMMERCIAL VEHICLES

BACKGROUND AND SUMMARY OF THE INVENTION

1. Technical Field

The present invention relates to a braking system for vehicles, particularly commercial vehicles.

2. State of the Art

German patent document DE 2 726 640 A1 shows a braking system for vehicles having a service brake valve, which is connected by way of pneumatic lines with ABS-valves of a vehicle axle. The ABS-valves are each connected with an assigned pneumatic/hydraulic converter. The converters convert a brake pressure pneumatically controlled into the converters by the ABS-valves into a hydraulic brake pressure for assigned vehicle brakes. In the converters, sensors are integrated, which sense physical quantities which occur when a brake pressure defined by the driver is controlled-in. The sensors respond and generate a warning signal when, during the ventilation of the assigned pneumatic/hydraulic converter, a pneumatic piston of the converter is in a stop position. When at least one sensor responds, the brake pressures of the vehicle brakes on both sides of the vehicle axle are limited by the bleeding of the assigned ABS-valves.

The firm brochure "Antilock Systems (ABS) for Commercial Vehicles", Section 7, WABCO Co., 1992, describes a combined compressed-air/hydraulic braking system, in which case one pneumatic/hydraulic servo cylinder respectively is assigned to the brakes of the rear axle, one ABS valve respectively being connected in front of the servo cylinders. The servo cylinders are pneumatically acted upon via pressure by way of a foot brake valve and the assigned ABS valves. The servo cylinders hydraulically transmit this brake pressure to the rear-axle brakes. The ABS valves are controlled as a function of the signals supplied by rotational wheel speed sensors.

From German patent document DE 44 23 086 A1, a slip-controlled hydraulic braking system is known in the case of which a travel sensor is provided centrally, that is, at the hydraulic master brake cylinder actuated by way of the brake pedal. The travel sensor senses the travel carried out by the brake pedal. When the master brake cylinder volume is almost exhausted although a further brake pressure buildup is desired, the travel sensor will signal that an additional pressure medium volume is required.

From German patent document DE 38 28 9321 A1, a hydraulic braking system is known in the case of which a travel sensor for sensing the piston path is also provided at the master brake cylinder. The travel sensor permits the detection of a disturbance at the braking system.

From German patent document DE 39 21 309 A1, a braking system is known in the case of which the driver defines, by way of the position of a service brake valve, a brake pressure for the vehicle, which is controlled into the ABS valves assigned to the front wheels of the vehicle. The ABS-valves limit the controlled-in pressure such that the vehicle wheels do not lock and transmit the possibly limited pressure to the wheel brake cylinders of the front wheel brakes. In this case, the actually controlled-in pressure is measured by pressure sensors and is processed by an electronic control system.

From the Automotive Handbook/Bosch, 22nd Edition, VDI Publishers, Dusseldorf, 1995, Page 640, it is known to use, in the case of trucks, service brake systems with a pneumatic-hydraulic power transmission, in which case the driver defines a pneumatic brake pressure which is converted to a hydraulic brake pressure for operating the vehicle brakes.

If a leakage occurs in the hydraulic part of the braking system, this leads to a partial or complete brake failure. If two independent hydraulic circuits are provided, for example, at the front axle for the right and the left brake, and if one of these two should fail while the other is operating properly, a yawing moment occurs during a braking operation. This yawing moment, particularly during braking in curves, may result in a swerving of the vehicle.

It is an object of the invention to provide a system which permits a leakage detection in the hydraulic brake system and a stabilizing of the driving condition.

This object is achieved by a braking system for vehicles, particularly commercial vehicles, having a service brake valve which is connected by way of pneumatic lines with ABS-valves of a vehicle axle. Each ABS-valve is connected with an assigned pneumatic/hydraulic converter, which converts a brake pressure pneumatically controlled into the converter by the ABS-valve into a hydraulic brake pressure for an assigned vehicle brake. Sensors are integrated into the assigned converters for sensing physical quantities which occur during the controlling-in of a brake pressure defined by the driver. The sensors respond and generate a warning signal when, during the ventilation of the assigned pneumatic/hydraulic converter, a pneumatic piston of the converter is in a stop position. When at least one sensor responds, the brake pressures of the vehicle brakes on both sides of the vehicle axle are limited by the bleeding of the assigned ABS-valves. The sensors of the pneumatic/hydraulic converters are connected with an electronic brake control unit, which controls the ABS-valves such that, when one of the two sensors responds, the electronic brake control unit limits the brake pressure which is controlled into that vehicle brake which is assigned to the other sensor to a defined maximum pressure. Advantageous developments and further developments are contained in the subclaims.

The basic principle of the invention consists of providing, in the case of a pneumatic-hydraulic braking system with a pneumatic/hydraulic converter which converts a pressure pneumatically controlled-in by the driver into a hydraulic brake pressure, a sensor which senses a physical quantity occurring in the converter when the pneumatic pressure is controlled in, and which generates a warning signal when a defined quantity is sensed.

The physical quantity to be sensed may, for example, be a pressure or a piston position of a piston of the pneumatic/hydraulic converter. From this quantity, a conclusion can be drawn with respect to a leakage in the hydraulic braking system. If such a disturbance is detected, critical driving conditions can be stabilized which occur when the brake is operated and during which, for example, because of a one-sided brake failure, a yawing movement occurs. This can be achieved by means of a partial or complete bleeding of a brake on the opposite vehicle side, which takes place, for example, by way of an ABS-valve assigned to the brake. The vehicle therefore remains on its track in a stable manner even in the event of a one-sided brake failure.

According to a further development of the invention, the pneumatic/hydraulic converter is a servo cylinder with a pneumatic and a hydraulic converter part. In this case, the sensor can be integrated in the pneumatic part of the converter. The sensor may, for example, be an electric switch which will respond only when a pneumatic piston of the converter moves into a stop position or end position when the converter is ventilated, that is, when it is acted upon by brake pressure. Such a position will not be reached when the braking system is intact because then a hydraulic brake pressure builds up which counteracts a further displacement of the piston and limits the "piston stroke". Thus, when such a "critical" piston position is reached, a clear conclusion can be drawn that there is a leak in the hydraulic part of the braking system.

As an alternative, a pressure sensor may also be provided which senses a hydraulic pressure failure behind the pneumatic/hydraulic converter.

The arrangement according to the invention is preferably provided on both sides of a vehicle axle, particularly the front axle. When one of the two sensors assigned to the front wheels responds and generates a warning signal, this warning signal can be used as an input signal for an electronic brake control system. The control system regulates, for example, the brake pressure at the other front wheel such that a stable driving condition occurs, and increases the brake pressure at the rear wheel such that a residual braking effect is available which is as good as possible.

BRIEF DESCRIPTION OF THE DRAWING

In the following, the invention will be explained in detail in connection with the single FIG. 1, which illustrates a pneumatic hydraulic braking system equipped with an ABS system.

DETAILED DESCRIPTION OF THE DRAWING

Figure 1:
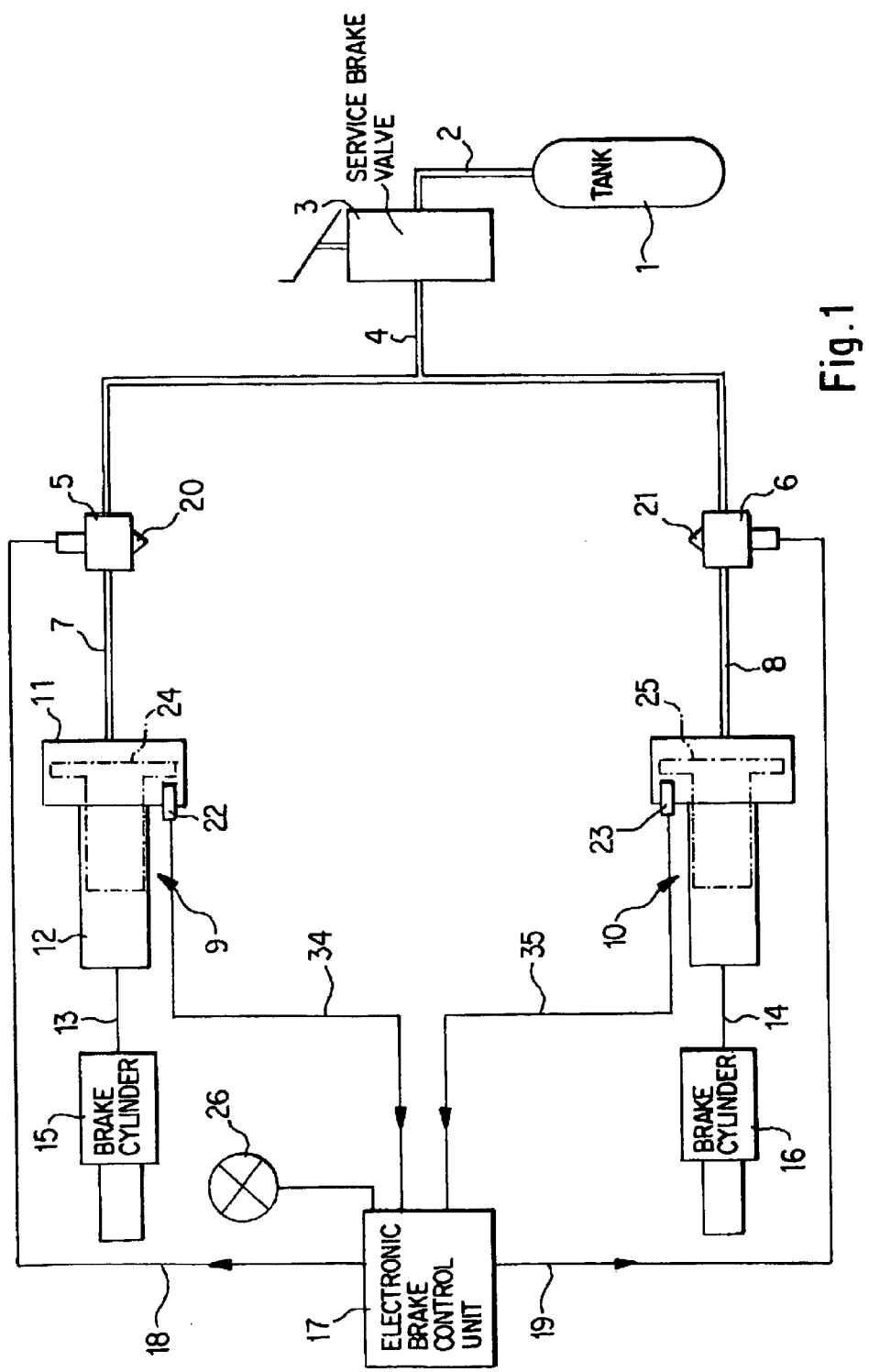

FIG. 1 illustrates a pneumatic-hydraulic braking system which is equipped with an ABS system. A storage tank 1 for compressed air is connected by way of a compressed-air line 2 with a service brake valve 3 to be operated by the driver. From the service brake valve 3, a pneumatic line 4 leads to a first ABS valve 5 and to a second ABS valve 6. From the ABS-valves 5 and 6 respectively, one pneumatic line 7 and 8 respectively leads to a servo cylinder 9 and 10 respectively. The servo cylinders 9, 10 act has pneumatic/hydraulic converters, each having a pneumatic converter part 11 and a hydraulic converter part 12. From the hydraulic converter part 12, one hydraulic line 13 and 14 respectively leads to a brake cylinder 15 and 16 respectively which are assigned, for example, to the front wheels of a truck. Thus, two independent "hydraulic circuits" are provided at the front axle.

Furthermore, an electronic brake control unit 17 is provided which processes rotational wheel speed signals supplied by rotational wheel speed sensors (not shown) and regulates the brake pressure supplied to the servo cylinders 9, 10 and the assigned brake cylinders 15, 16 respectively such that a locking of the wheels is prevented. For this purpose, the electronic brake control unit 17 is connected by way of electric control lines 18 and 19, respectively, with the ABS valves 5 and 6, respectively. The ABS valves 5 and 6 each have a bleeding device 20 and 21 by way of which a brake pressure can be blown off which may have been controlled in too high.

In addition, the servo cylinders 9 and 10, each have a sensor 22 and 23. sensors are connected by way of assigned electric lines 34 and 35, perspectively, in parallel to the electronic brake control unit 17. Here, the sensors 22 and 23 are integrated in the pneumatic converter part 11 and sense the position of a respective pneumatic piston 24 and 25 provided in the respective servo cylinder 9 and 10. In the case of a proper method of operation of the braking system, the pneumatic pistons 24, 25 move within a constructively defined "normal stroke range".

If a leakage occurs, for example, in the hydraulic line 13 or in the brake cylinder 15, the pneumatic piston 24, when it is acted upon by compressed air, experiences no or only a reduced counterpressure and is displaced into a stop or end position which is not reached in the case of a proper method of operation.

In the event of a leakage, the brake cylinder 15 therefore fails partially or completely, so that the vehicle is overbraked on the opposite side, that is, by the brake cylinder 16. This causes a yawing moment and may lead to a swerving of the vehicle. The sensor 22 detects such a "critical" position of the pneumatic piston 24 and supplies a corresponding signal to the electronic brake control system 17. The electronic brake control system 17 derives therefrom that one or both hydraulic circuits have failed and then controls the ABS valve 6 such that the latter completely or at least partially blows off the pressure controlled-in via the pneumatic line 4 by way of the bleeding device 21. As a result, it is ensured that the vehicle is not overbraked on the side of brake cylinder 16 and can be held on track in a stable manner.

In order to inform the driver of the critical driving condition, a warning light 26 may be provided in the center console 26. The warning light 26 lights up when one of the two sensors 22, 23 responds.

It should be stressed that, if at least one of the two sensors 22 and 23 responds, it may be provided that the brake cylinders 15 and 16 are completely bled for a stabilization of the driving condition. As an alternative, it may also be provided that, for maintaining a certain residual braking force at the front axle—in addition to the remaining braking force at the rear axle—the intact front-axle brake circuit is acted upon by a brake pressure which is reduced in comparison to a "normal braking", which is a "compromise" between a maximally possible braking force and the best-possible directional control.

INDUSTRIAL APPLICABILITY the present invention provides a braking system with a detection device for detecting a leakage in the hydraulic braking system and therefore has far-reaching industrial applicabilities.

What is claimed is:

1. A braking system for a vehicle, comprising:

a service brake valve;

first and second ABS-valves of a vehicle axle, each ABS-valve being connected to the service brake valve by way of a pneumatic line;

first and second pneumatic/hydraulic converters respectively connected to the first and second ABS-valves, said converters converting a brake pressure pneumatically controlled into the converters by way of the respective ABS-valve into a hydraulic brake pressure for an assigned hydraulic circuit for an assigned vehicle brake, each assigned hydraulic circuit being independent;

first and second sensors, for sensing physical quantities which occur during the controlling-in of the brake pressure defined by a driver of the vehicle, the first and second sensors being integrated into the respectively assigned first and second converters, said sensors responding and generating a warning signal when, during a ventilation of the respectively assigned pneumatic/hydraulic converter, a pneumatic piston of the converter is in a stop position indicating a failure of the assigned hydraulic circuit;

and an electronic brake control unit operatively coupled with the first and second sensors of the pneumatic/hydraulic converters, said control unit controlling the ABS-valve such that, when one of the first and second sensors responds with the warning signal indicating the failure of the assigned hydraulic circuit, the control unit limits only the brake pressure controlled into the vehicle brake assigned to the hydraulic circuit of the other sensor to a defined maximum pressure.

2. The braking system according to claim 1, wherein the first and second pneumatic/hydraulic converters are servo cylinders having a pneumatic part and a hydraulic part, the assigned sensor being integrated into the pneumatic part.

3. The braking system according to claim 1, wherein the first and second sensors are electric switches.

4. The braking system according to claim 2, wherein the first and second sensors are electric switches.

5. The braking system according to claim 1, wherein the pneumatic/hydraulic converters are assigned to vehicle brakes arranged on a front axle of the vehicle.

6. The braking system according to claim 2, wherein the pneumatic/hydraulic converters are assigned to vehicle brakes arranged on a front axle of the vehicle.

7. The braking system according to claim 3, wherein the pneumatic/hydraulic converters are assigned to vehicle brakes arranged on a front axle of the vehicle.

8. The braking system according to claim 1, further comprising a warning light providing a warning indication as soon as one of the first and second sensors responds.

9. The braking system according to claim 2, further comprising a warning light providing a warning indication as soon as one of the first and second sensors responds.

10. The braking system according to claim 3, further comprising a warning light providing a warning indication as soon as one of the first and second sensors responds.

11. The braking system according to claim 5, further comprising a warning light providing a warning indication as soon as one of the first and second sensors responds.

12. The braking system according to claim 1, wherein the vehicle is a commercial vehicle.

13. A braking system for a vehicle having a vehicle brake arranged on each end of a vehicle axle, comprising:

a service brake valve operatively connected via pneumatic lines with an ABS-valve assigned to each vehicle brake;

a pneumatic/hydraulic converter coupled to an assigned ABS-valve for converting a brake pressure pneumatically controlled into the converter via the assigned ABS-valve into a hydraulic brake pressure for the assigned vehicle brake;

a sensor integrated into an assigned converter, the sensor generating a warning signal when, during ventilation of the assigned converter, a pneumatic piston of the converter is in a stop position; and an electronic brake control unit operatively coupled with each sensor integrated into the assigned converter, said control unit operating to control the ABS-valves such that, when one sensor responds, only a brake pressure controlled-into the vehicle brake assigned to another sensor is limited to a defined maximum pressure.

14. The braking system according to claim 13, wherein the pneumatic/hydraulic converter is a servo cylinder having a pneumatic part and a hydraulic part, the sensor being integrated into the pneumatic part.

15. The braking system according to claim 13, wherein the sensor is an electric switch.

16. The braking system according to claim 13, wherein the pneumatic/hydraulic converters are assigned to vehicle brakes arranged on a front vehicle axle.

17. The braking system according to claim 13, further comprising a warning light which provides an indication as soon as a sensor responds.

18. A method of braking a vehicle equipped with pneumatic/hydraulic converters, one of which is arranged in series between a corresponding ABS-valve and a corresponding vehicle brake on a vehicle axle, the method comprising the acts of:

sensing a physical quantity which occurs when inputting a pneumatic pressure, defined by the driver, into the converter;

signaling when a pneumatic piston of the converter is in a stop position during ventilation of the converter; and when the signaling occurs, only limiting a hydraulic brake pressure fed to the vehicle brake on the vehicle axle assigned to the converter, for which a signal did not occur, to a defined maximum pressure.

19. The method according to claim 18, wherein the vehicle axle is a front axle, the method further comprising the act of:

increasing a brake pressure at vehicle brakes assigned to a rear axle of the vehicle.

20. The braking system according to claim 13, wherein the vehicle axle is a front axle; and wherein the electronic brake control unit, when said one sensor responds, operates to increase a brake pressure at vehicle brakes assigned to a rear axle of the vehicle.

* * * * *